(12) United States Patent
Naik et al.

(10) Patent No.: US 7,388,834 B2
(45) Date of Patent: Jun. 17, 2008

(54) SYSTEM AND METHOD FOR CONTROLLING NETWORK TRAFFIC FLOW IN A MULTI-PROCESSOR NETWORK

(75) Inventors: Sachin U. Naik, Pune (IN); Robert L. Jardine, Cupertino, CA (US); Tatsuhiro Torii, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1051 days.

(21) Appl. No.: 09/895,577

(22) Filed: Jun. 28, 2001

(65) Prior Publication Data

US 2002/0024938 A1 Feb. 28, 2002

Related U.S. Application Data

(60) Provisional application No. 60/227,737, filed on Aug. 24, 2000.

(51) Int. Cl.
*H04L 12/26* (2006.01)
(52) U.S. Cl. .................................. 370/231; 370/252
(58) Field of Classification Search ........ 370/229–238, 370/412–419
See application file for complete search history.

(56) References Cited

U.S. PATENT DOCUMENTS 6,252,851 B1 * 6/2001 Siu et al. .................... 370/236
6,643,259 B1 * 11/2003 Borella et al. ............... 370/231
7,035,214 B1 * 4/2006 Seddigh et al. .............. 370/231
7,047,312 B1 * 5/2006 Aweya et al. ................ 709/235
2002/0034182 A1 * 3/2002 Mallory ....................... 370/394
2003/0206527 A1 * 11/2003 Yim ............................ 370/238

* cited by examiner

*Primary Examiner*—Wing F. Chan
*Assistant Examiner*—Michael J Moore, Jr.

(57) ABSTRACT

A system and method for controlling network traffic flow in a multi-processor network is disclosed. The method employs a two-part algorithm to determine when it is appropriate for a client node to transmit data over a network to one or more server nodes. The first part of the algorithm calls for the client node to transmit data over the network after receiving an acknowledgement from one or more of the server nodes to which data transfer is outstanding. The second part of the algorithm provides for the client node transmitting data over the network after a predetermined time interval has elapsed since a data transmission. The time interval is based, in part, on the length of outstanding data packets and a statistical analysis of the number of nodes transmitting or receiving data packets. The transmission of data over the network is accomplished by a hybrid scheme, comprising a combination of PUSH and PULL transmission protocols.

18 Claims, 4 Drawing Sheets

SYSTEM AND METHOD FOR CONTROLLING NETWORK TRAFFIC FLOW IN A MULTI-PROCESSOR NETWORK

The present application claims the benefit of U.S. Provisional Application Ser. No. 60/227,737, filed Aug. 24, 2000.

FIELD OF THE INVENTION

The present invention generally relates to multi-processor networks and, more particularly, to a system and corresponding method for controlling traffic flow within a multi-processor network.

BACKGROUND OF THE INVENTION

Multi-processor networks are commonly used in today's office and computing environment. One example of a multi-processor network is a local area network (LAN). In LAN's, several computers, or suitable devices, are interconnected to a common communication link (i.e., a bus) by way of an interface. The computers communicate with one another by sending messages over the communication link. When one computer wants to communicate to a specific computer or broadcast a message to all the computers connected to the network, the sending computer gains access to the communication link and then transmits the message over the link. When more than one computer sends information, or requests control of the communication link, the increased flow of information provided to the network from the transmitting or requesting computers causes the network to become overloaded. An overloaded network results in poor network performance and corresponding errors in the information that is being transmitted over the network.

Conventional approaches of solving the performance and error recovery problems associated with overloaded networks require agreement among the multiple computers (or nodes) of the network about when it is proper to send additional information. Such conventional approaches are often complex and prone to errors.

Multi-processor networks, including sub-processor systems interconnected by routing devices, have been introduced to solve the problems associated with overloaded networks. In such multi-processor systems, the sub-processors communicate with each other through the routing devices. Inter-processor communications are comprised of information packets that are sent/received from the memories of source or destination processors. An access validation method may be used to grant/deny access to a memory of a corresponding processor or sub-processor.

SUMMARY OF THE INVENTION

The aforementioned and related drawbacks associated with conventional methods for controlling traffic flow in a multi-processor network are substantially reduced or eliminated by the present invention. The present invention is directed to a traffic flow control method which controls the sending of messages onto a network in order to avoid exceeding the operating capacity of the network, or of the devices connected to the individual nodes of the network; thereby, achieving higher error-free throughput.

In application, the present invention employs a two-part transmission protocol to ascertain when a sending (or client) node can transmit data to a receiving (or server) node. In accordance with the present invention, the client node transmits a message to one or more nodes connected to the network. Concurrent with the transmission of the message, the address of the server node, the size of the message and the time of transmission is stored in an outstanding request queue that is at least partially maintained in the client node. In an exemplary embodiment, the outstanding request queue can store information pertaining to about twenty transmitted messages. Thus, the client node can have up to about twenty transmitted messages pending at any given time. By limiting the amount of messages that a given client node can transmit, network traffic is maintained at a manageable level.

In the first part of the algorithm, the server node will send a reply to the client node. This reply notifies the client node that the transmitted message has been received. Upon receiving the reply, the corresponding transmission entry in the outstanding request queue of the client node is deleted and replaced with another entry. At this point, the client node is free to transmit other messages onto the network.

In the second part of the algorithm, the client node will be free to transmit other messages onto the network after an entry in the corresponding outstanding request queue has not been removed after a threshold time interval. In an exemplary embodiment, the time interval is derived as a function of the size of the message(s) present in the outstanding request queue, the number of nodes acquiring information over the network and the transmission rate of the network. After lapse of the threshold time interval, the oldest entry in the outstanding request queue is removed, thereby allowing the client node to be able to transmit another message onto the network. Employing the aforementioned two-part transmission protocol results in the optimum amount of traffic flow being present on the network, without exceeding the processing capabilities of any individual node on the network.

An advantage of the present invention is that it provides the ability to maximize network efficiency by controlling the amount of traffic that is present on the network.

Another advantage of the present invention is that it provides the ability to control the transmission rate of data onto a network.

Yet another advantage of the present invention is that it uses existing network resources.

Still yet another advantage of the present invention is that it can be used in larger network environments, where one network communicates with a completely different network.

A feature of the present invention is that it is straightforward to implement.

BRIEF DESCRIPTION OF THE DRAWINGS

The aforementioned and related advantages and features of the present invention will become better understood upon review of the following detailed description of the invention, taken in conjunction with the following drawings, where like numerals represent like elements, in which.

DETAILED DESCRIPTION OF THE INVENTION

Figure 1:
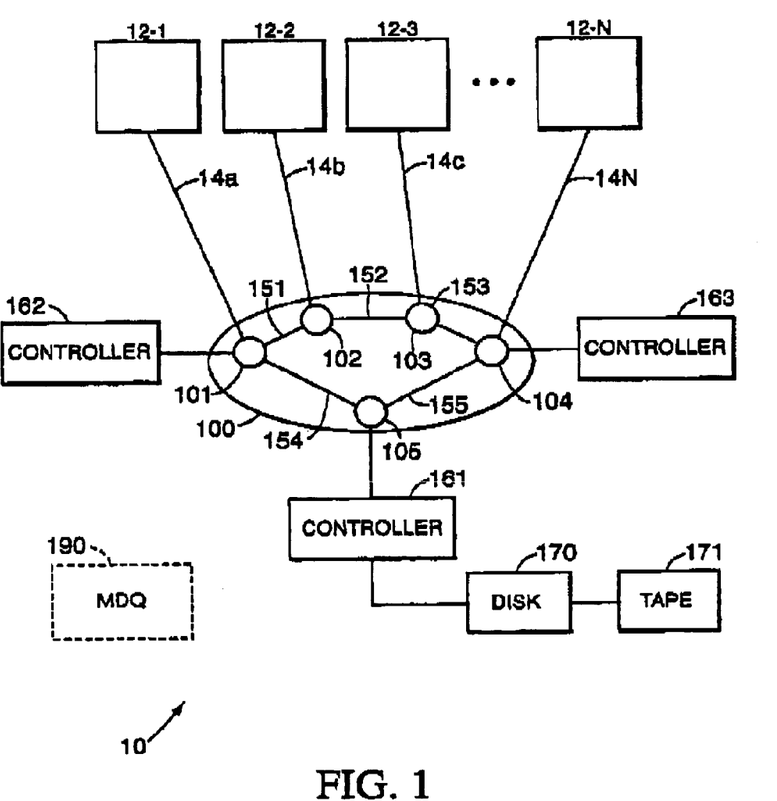
FIG. 1 is a schematic illustration of a multi-processor network incorporating the traffic flow control method of the present invention.

The present invention will now be described with reference to FIGS. 1-6. FIG. 1 is a schematic representation of a multiprocessor network incorporating the traffic flow control protocol of the present invention. Network 10 includes a plurality of nodes, each having a processing device (i.e., personal computer) 12-1, 12-2 . . . 12-N, or other suitable device connected to a corresponding network bus comprised of a series of links $14_A$-$14_N$. Each of the processing devices 12-1-12-N is substantially similar in structure. Thus, only processing device 12-1 will be described in greater detail below.

The processing devices 12-1-12-N communicate with one another through a communication network 100. An exemplary network is described in U.S. Pat. No. 5,751,932, also assigned to the assignee of the present invention, which is incorporated herein by reference. The discussion of the exemplary network is for purposes of illustration and example, and is not intended to limit the scope or applicability of the present invention in any fashion. The communication network 100 comprises a series of routers 101-105 that are interconnected through a series of links 151-155. For example, device 12-1 can transmit information to device 12-3 by first gaining access to the communication network 100 through bus $14_A$. Upon receiving access to the communication network, the information from device 12-1 is transmitted on network bus $14_A$ to router 101. The information is then transmitted on link 151 through router 102 and link 152 where it is then received at router 103. Router 103 then transmits the information to device 12-3 on network bus $14_C$. Connected at various points along the network 100 are a plurality of controllers 161-163 that provide a link to input/output (I/O) devices such as disk subsystem 170 and tape subsystem 171. The controllers 161-163 can also be used to connect another group of networked computers to the processing devices 12-1-12-N illustrated in FIG. 1.

Figure 2:
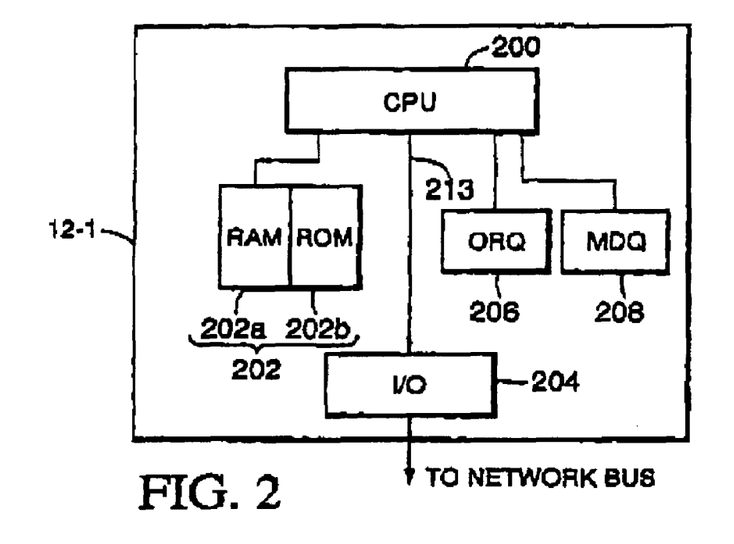
FIG. 2 is a schematic block diagram of an exemplary processing device connected to a node of the multi-processor network illustrated in FIG. 1.

As illustrated in FIG. 2, an exemplary processing device 12-1 includes a central processing unit (CPU) 200 which controls the operation of the corresponding processing device 12-1. Also included within the device 12-1 is a memory subsystem 202 including a random access memory (RAM) 202a, which is a volatile memory for storing application programs and associated data. The memory subsystem 202 may also include a read only memory (ROM) 202b, which may be a non-volatile memory for storing the operating system and other control programs that are executed by the CPU 200. The processing device 12-1 has a unique identifier (i.e., node address), which is also stored in the memory subsystem 202.

A communication link (I/O) 204 is coupled to the CPU 200 via line 213 and is operative to send and receive messages and other information that are transmitted on the network bus 14. The peripheral devices, such as disk subsystem 170 and tape subsystem 171 may be connected to the processing device 12-1 through the communication link 204. The drivers that control the peripheral devices are also stored in the memory subsystem 202.

Figure 3:
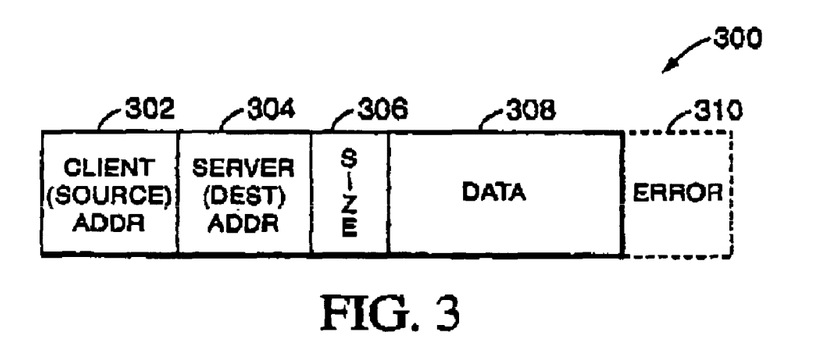
FIG. 3 is a schematic diagram of a data packet that is transmitted along the multiprocessor network illustrated in FIG. 1.

The processing devices 12-1-12-N communicate with one another by sending messages to each other. The messages that are transmitted through the communication network 100 are contained within data packets 300 as illustrated in FIG. 3. As shown in FIG. 3, the data packet 300 includes a client address field 302 which contains the address of the node that is transmitting or sending information over the network. Server address field 304, comprises a plurality of bits which contain the address of the destination (e.g. receiving) node of the communication network. A size field 306 is comprised of a plurality of bits which identify the size of the message that is being transmitted onto the network. Data field 308 maintains the data that is being transmitted. In an alternate embodiment, error correction bits 310 can be appended to the data packet 300 to provide error correction or other housekeeping functions.

As discussed above, the processing devices 12-1-12-N coupled to the communication network 100 communicate by sending data packets to each other. For example, processing device 12-1 may send a data packet 300 to processing device 12-3 by first obtaining access to the network bus through the communication link 204 via a suitable protocol. Examples of such protocols include locks, token rings, exclusion techniques, etc. After processing device 12-1 has accessed the network on link $14_A$, a data packet 300 containing the data is sent from the CPU 200 of device 12-1 to the network 100 through the communication link 204. In application, the transmission of the data packet 300 over the network can be accomplished by employing either a PUSH protocol or a PULL protocol.

(i) PUSH Protocol

In the PUSH protocol, a first node of a communication network can transmit data and corresponding information to a second node within the same communication network, or another communication network, by placing the data to be transferred directly onto the network. Referring back to FIG. 1, this is accomplished by the first processing node 12-1 obtaining access to the communication network 100 via network link $14_A$. After accessing the network, a corresponding data packet (as illustrated in FIG. 3) including information in the data field 308 is transmitted to a receiving node (i.e., processing node 12-3). In application, the unique identifier of processing node 12-3 is placed in the server address field 304. Upon constructing the message, the CPU 200 (FIG. 2) of processing node 12-1 transmits the data packet 300, including the address of the receiving or destination node 12-3 in the server address field 304, to the network 100 via router 101. Router 101 then transmits the data packet to router 102 through link 151.

In operation, each of the processing nodes 12-1-12-N listens for communications on the network 100 that are directed to the individual processing nodes via their corresponding network buses $14_A$-$14_N$ respectively. In an exemplary embodiment, the network can transmit information at a throughput rate of approximately 36 MBytes/sec. As the data in data packet 300 is meant for processing node 12-3, the data packet 300 is then passed from router 102 to router 103 via link 152. Upon arriving at router 103, the data packet 300 is transmitted to the CPU 200 of processing node 12-3 via the corresponding communication interface 204 via network bus $14_C$. Upon arriving at the corresponding CPU of the destination node 12-3, the CPU processes the data maintained in the data field 308 and performs any corresponding operations decoded therefrom.

(ii) PULL Protocol

In the PULL protocol, the information that is to be transmitted and processed by the receiving or destination node 12-3 is not transmitted to the destination node within the data field 308 of the transmitted data packet 300. Instead, the client or source node (i.e., processing device 12-1) transmits the location of the data to be processed within either RAM 202A or ROM 202B to the destination node (i.e., processing device 12-3). This is performed by PUSHING the address of the corresponding data to the destination node 12-3. Upon receiving the address location of the data, the destination node 12-3 then extracts ("PULLS") the information directly from the corresponding memory location in processing node 12-1 via any type of direct memory removal process (e.g., DMA or RDMA). Upon obtaining the information directly from the memory subsystem of the client or sending node 12-1, the destination node 12-3 then sends a reply to the client node 12-1 notifying the client node that the information has been retrieved.

A recurring problem with using either the PUSH or PULL transmission protocols described above, is that often times more than one process within a given processing node (e.g., 12-1) is sending information to a corresponding destination node (e.g., 12-3). In addition, multiple nodes within the same network can be sending multiple requests to the same destination node, or multiple destination nodes can be pulling corresponding information from the same source node. This will result in either the transmission information being backed up in one of the corresponding routers 101-105 of the network, or the information can exceed the speed with which a particular CPU can process the same. It is during either of these two situations, that the network becomes overloaded which results in error recovery and performance degradation. A result of the overload condition is that the client and server nodes have to resynchronize the connection after an error. This can take a significant amount of time and cause performance degradation. The traffic control method of the present invention is designed to reduce the number of network transmission errors; thereby enhancing both the throughput of the network and the corresponding data integrity of the information transmitted thereon. The traffic flow control method of the present invention will now be described with reference to FIGS. 4-6.

Referring very briefly back to FIGS. 1-2, the processing devices 12-1-12-N of the present invention, in addition to having the corresponding CPU 200, memory subsystem 202 and communication interface 204, also includes an outstanding request queue (ORQ) 206 maintained at least partially therein. Although illustrated as being separate from the memory subsystem, the ORQ 206 can be maintained within the memory subsystem 202. The ORQ 206 is a table used to monitor and limit the number of outstanding data packets that a given processing node can transmit on the communication network 100. In this fashion, each processing node of the network only transmits information within the operating parameters of its corresponding CPU 200.

Figure 4:
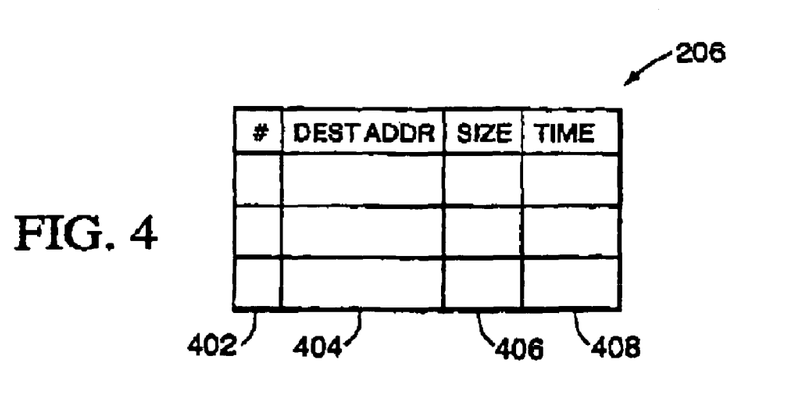
FIG. 4 is a schematic representation of the outstanding request queue of the exemplary processing device illustrated in FIG. 2.

An exemplary embodiment of the ORQ is illustrated in FIG. 4. As illustrated in FIG. 4, the ORQ 206 is a table including a number field 402, which is used to identify the number of the pending request as outstanding for the particular processing network. In an exemplary embodiment of the present invention, the ORQ table 206 can maintain approximately 20 outstanding messages. In other words, the ORQ table 206 can maintain entries of information that have been transmitted over the network to approximately 20 processing nodes. The ORQ table 206 also includes a destination address field 404 which is used to maintain the address that the corresponding outstanding transmission was sent to. Size field 406 maintains the size of the message (or bytes of information) that was sent to the destination node identified in destination address field 404. Finally, time field 408 includes the time that the message was transmitted. The time field 408 is used to calculate a "safety" period after which the source (or client) node can transmit additional pieces of data on to the communication network.

Figure 5:
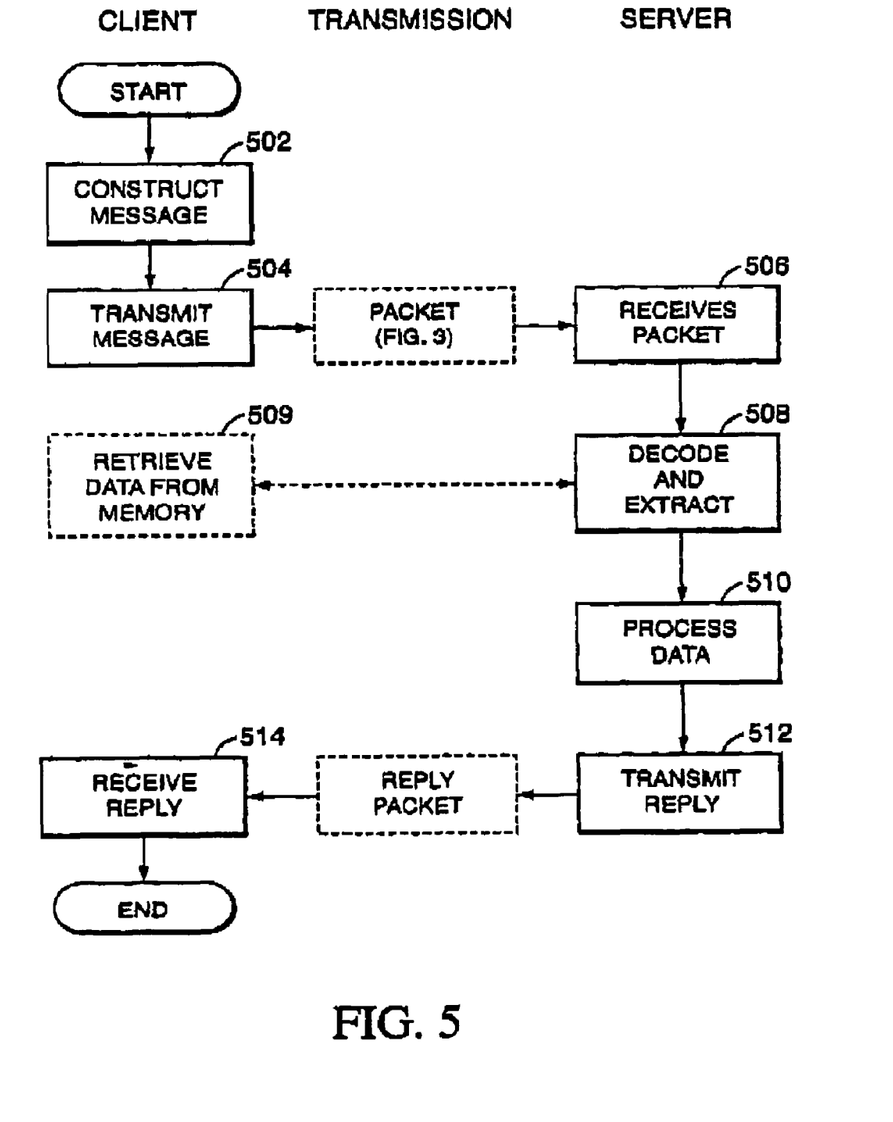
FIG. 5 is a flow chart illustrating the operating steps performed by the multiprocessor network in transmitting data between nodes thereof according to the present invention.
Figure 6:
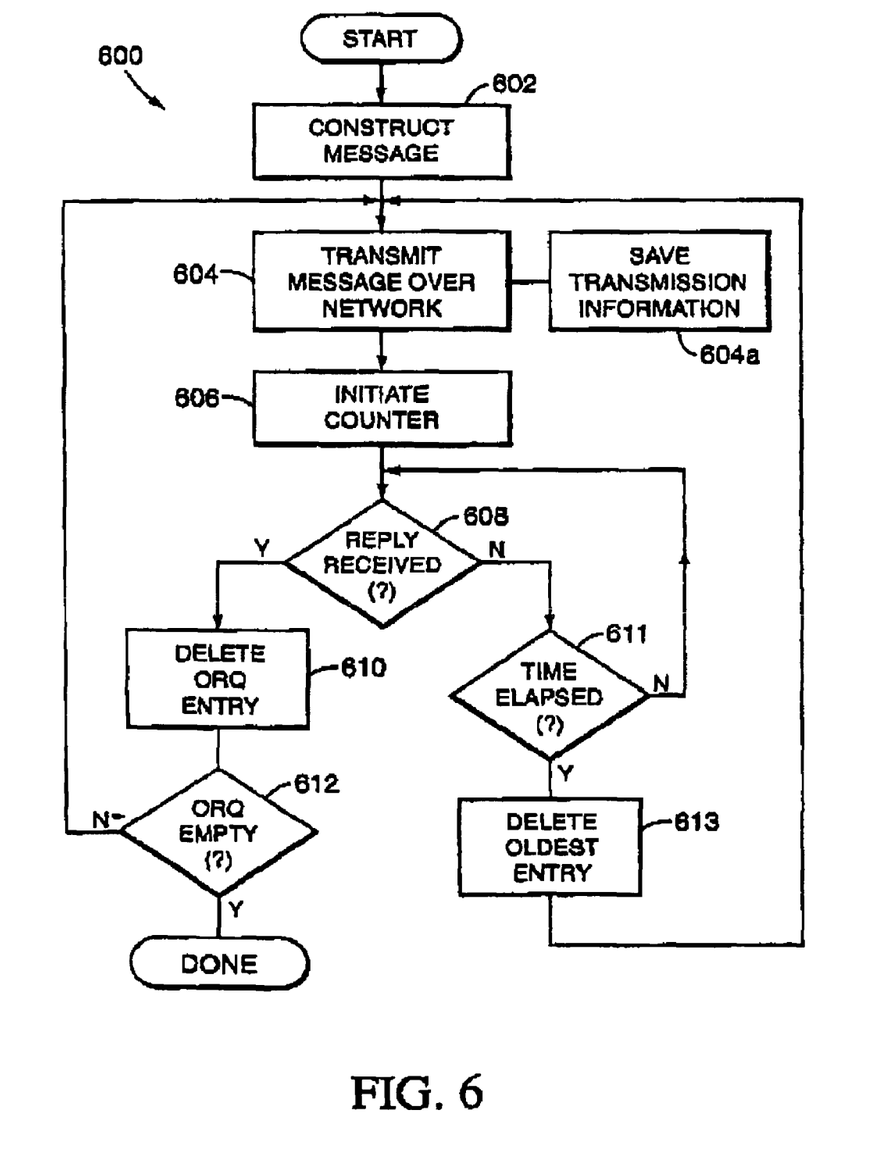
FIG. 6 is a flow chart illustrating the operating steps performed by an individual processing device when transmitting data onto a network according to the present invention.

The transmission protocol employed by the network 10, according to the present invention, will now be described in greater detail with reference to FIGS. 5 and 6. FIG. 5 is a flow chart illustrating the operating steps performed by the multiprocessor network 10 in transmitting data between at least two processing nodes thereof. FIG. 6 is a flow chart illustrating the operating steps performed by an individual processing node when transmitting data over the communication network 100. For ease of description and understanding of the invention, a data transmission between processing device 12-1 and processing device 12-3 will be described below.

As the information is being sent from processing device 12-1 to processing device 12-3, processing device 12-1 will be referred to as the client (or sending) node. Processing device 12-3 will be referred to as the server (or receiving) node. The present invention modifies the aforementioned PUSH and PULL transmission protocols in order to perform the traffic flow control algorithm of the present invention.

The transmission protocol begins at step 502 where the message to be transmitted is constructed. The constructed message is embodied in one or more data packets 300 (FIG. 2) and then PUSHed to the server node 12-3 in step 504. As discussed above, the present invention uses a modified transmission protocol to transfer information between the several nodes that comprise the network 10. In an exemplary embodiment, the data packet that is transmitted by the client node 12-1 includes the address within the memory subsystem 202 of the client node 12-1 that the information to be later processed is stored in. Thus, the data packet 300 that is transmitted to the server node 12-3 in step 504, upon being decoded provides the server node 12-3 with the address of where the data to be processed is located.

Upon decoding the address containing the desired information, the server node 12-3 PULLs the data directly from the memory subsystem 202 of the client node 12-1 in step 509 and then processes the retrieved data in step 510. Upon completing the processing of the data retrieved in step 509, the server node 12-3 then PUSHes a reply to the client node 12-1 in step 512. Upon receiving the reply in step 514, the transmission of data is complete.

Although described as being transmitted after processing has been completed, the present invention will work equally as well in those situations where the server node 12-3 transmits a reply to the client node 12-1 upon retrieval and before processing of the data. What is important to note here is that the transmission protocol illustrated in FIG. 5, combines both PUSH and PULL transmissions to complete the data transmission. In the first instance, the address of the location of the data to be transmitted is PUSHed to the server node 12-3 by the client node 12-1. Upon receiving the address of the desired data, the server node 12-3 then PULLs, or retrieves, the data to be processed directly from the client node 12-1. After the retrieval process from the memory subsystem of the client node 12-1 is complete, the server node then PUSHes a reply to the client node 12-1 indicating that the data (along with additional information) has been retrieved from the client node 12-1.

It can be appreciated that the time required for the server node 12-3 to process the information retrieved from the client node 12-1 can take a considerable amount of time. In those situations where the processing time is lengthy, the client node 12-1 may not be aware that the server node 12-3 has retrieved the data from the corresponding memory subsystem 202. Thus, the client node 12-1 may not transmit any additional requests or data onto the network until a reply is received. This may slow down the overall efficiency of the network as multiple client nodes 12-1 are not transmitting information. The present invention compensates for any extended processing delays by a corresponding server node, by allowing the client node 12-1 to subsequently transmit data onto the network after a predetermined amount of time has elapsed. This feature of the individual processing nodes will be described in greater detail with reference to FIG. 6.

As illustrated in FIG. 6, the transmission of data over a network starts with the client node 12-1 constructing a message (step 602) to be transmitted on the network as a data packet. This data packet is then transmitted over the network (step 604) to corresponding server node(s). Concurrently with the transmission of the data packet, the transmission information corresponding to the data packet is saved in the ORQ table 206 (step 604a).

After the transmission information has been saved, a counter is initiated (step 606), to monitor the safety period in which it will be safe for the client node 12-1 to transmit subsequent data packets over the network. In essence, the counter is used to maintain the transmission rate of the client node 12-1. In an exemplary embodiment of the present invention, the transmission rate of the individual processing nodes of the network is calculated according to equation 1 below:

$$L*N/R \qquad (1)$$

where L equals the size (i.e., length) of the message being transmitted; N equals the virtual number of nodes or channels that are safe for transmission. Stated another way, N equals the number of nodes that may be simultaneously PULLing data from a corresponding client CPU; and R corresponds to the network throughput rate. The network throughput rate corresponds to the rate that data is passed through the interconnected routers that comprise the network. In an exemplary embodiment of the present invention, the network throughput rate is equal to approximately 36 MBytes/sec. Thus, in the embodiment illustrated in FIG. 1, the transmission of a 2 KByte message corresponds to a transmission interval of approximately 1.11 msec. Thus, a 2 KByte message can be safely transmitted over the network every 1.11 msec. Correspondingly, a 30 KByte message can be safely transmitted over the network every 16.67 msec. By using the transmission rate formula of equation 1, the amount of new traffic entering the network can be maintained within the tolerance of the network.

Referring back to FIG. 6, in step 608, the CPU of the client node 12-1 makes the determination as to whether a reply has been received to one of the corresponding outstanding transmissions. If a reply has been received, the corresponding entry in the ORQ table 206 is deleted in step 610. Next, in step 612, a determination is made as to whether the ORQ table 206 is empty. If the ORQ table 206 is not empty, the client node 12-1 returns to step 604 where a new message is then transmitted over the network. If the ORQ table 206 is empty, the process terminates.

On the other hand, if no replies have been received by the client node 12-1, a determination is then made in step 611 as to whether the time interval calculated in equation 1 has been exceeded. If the time interval has not been exceeded, the client node 12-1 returns to step 608 where a determination is made as to whether a reply to an outstanding transmission has been received. If the time period has elapsed, the oldest entry in the ORQ table 206 is deleted in step 613 and then the client node 12-1 returns to step 604 where a new message will be transmitted over the network.

By having the client node 12-1 wait for a corresponding time period between transmitting new data packets, the latency of the corresponding client nodes is reduced. This results in an efficient flow of data being transmitted over the network at any one time.

Thus, as illustrated above, the present invention provides a two-part transmission protocol which provides for the efficient and effective transmission of data over a network. In the first part of the protocol, a transmitting node is free to transmit subsequent data packets over the network upon receiving a reply to a previously transmitted data packet. In addition, if the transmitting node does not receive a reply to an outstanding transmission within a predetermined amount of time, the method assumes that it will be appropriate and safe to allow the transmitting node to send subsequent data packets over the network as the elapsed amount of time is within the tolerance range of the network throughput rate of the system. Thus, it will be safe to assume that the transferred data packet has been transmitted through the network.

In addition to the data transfer methodology described above, the traffic control method of the present invention can also be utilized to enhance the efficiency of the network architecture illustrated in FIG. 1, by allowing additional data packets to be transferred to any particular server node that has already had data transmitted thereto. This is referred to as "free-loading". In free-loading, for example, a client node will be free to send additional data packets to a server node that already has an entry in the ORQ table 206. Additional packets of information can be transmitted to such server nodes because the server node can only pull information from the client node at a predetermined rate. Therefore, the server node will extract information from the client node in the order with which the requests have been transmitted, within the processing (CPU speed) and data transfer rate of the communication network. Thus, the client nodes have the ability to effectively use up the entirety of the bandwidth of the transmission mechanism.

Referring again to FIG. 2, illustrated in dashed lines is a message deferral queue (MDQ) 208. This queue is partially maintained within the several client nodes of the communication network 100. The MDQ 208 is used to defer those transmissions to be provided on the network by the various client nodes when the ORQ table 206 of a particular client node is full. By maintaining deferred messages in the MDQ table 208, the present invention prevents the communication network 100 from becoming overloaded. In application, when an entry in a corresponding ORQ table 206 is deleted, the first message in the MDQ table 208 is then written to the ORQ table 206 and subsequently transmitted over the communication network 100. In an exemplary embodiment, the transfer of messages from the MDQ table 208 to the ORQ table 206 occurs within the transmission rate defined in equation 1 above.

The aforementioned detailed description of the invention has been provided for the purposes of illustration and description. Although the present invention has been described with respect to a specific embodiment, various changes and modifications may be suggested to persons of ordinary skill in the art, and it is intended that the present invention encompass such changes and modifications, as fall within the scope of the claims appended hereto.

What is claimed is:

1. A method for controlling data traffic over a network, comprising:
   (a) transmitting a message from a first node to at least a second node of the network;
   (b) determining an elapsed time of transmission of the message of step (a);
   (c) determining whether the second node has replied to the message transmitted in step (a) from the first node; and
   (d) transmitting a subsequent message from the first node upon the elapsed time of transmission of the message exceeding an elapsed time threshold,
   wherein the elapsed time threshold is determined by a size of the message, a virtual number of nodes over the network, and a minimum transmission rate of the network.

2. The method of claim 1, wherein step (a) further comprises:
   (a1) constructing the message to be transmitted; and
   (a2) maintaining transmission information relating to the message.

3. The method of claim 1, wherein step (c) further comprises (c1) receiving a reply message from the at least one second node.

4. The method of claim 2, wherein step (a2) further comprises storing the following transmission data: message size, transmission sending time and address of the at least one second node.

5. The method of claim 4, further including (e) detecting whether a message has been transmitted to the at least one second node; and (f) transmitting a subsequent message to the at least one second node upon detecting the address of the at least one second node in step (e).

6. The method of claim 1, wherein an elapsed time threshold calculation in step (d) comprises calculating:

$$L*N/R$$

where L is the size of the transmitted message; N is the virtual number of nodes and R is the minimum transmission rate of the network.

7. A method for controlling the rate of transmitting data over a network from a node of the network, comprising:
   (a) storing information relating to the transmission of data to a node on the network;
   (b) determining a time interval since an initiation of the data transmission of step (a); and
   (c) transmitting additional data onto the network upon the time interval exceeding a threshold time interval,
   wherein the threshold time interval is determined by a size of the data, a virtual number of nodes over the network, and a minimum transmission rate of the network.

8. The method of claim 7, further comprising (d) transmitting subsequent amounts of data to a particular node on the network upon locating an address of the particular node stored in step (a).

9. A communication system, comprising:
   a first node coupled to at least one second node by a transmission medium, the first node including a storage device for storing data;
   the first node including a processor for determining an elapsed time between data transmission, wherein subsequent data is transmitted from the first node upon the elapsed time exceeding an elapsed time threshold,
   wherein the elapsed time threshold is determined by a size of the data, a virtual number of nodes over the transmission medium, and a minimum transmission rate of the transmission medium.

10. The system of claim 9, wherein the storage device stores an identifier of the nodes that the first node has transmitted data to, the first node transmitting additional data to the at least one second node before receipt of a reply upon determining that a transmission is outstanding at the at least one second node.

11. The system of claim 9, wherein the storage device stores the size of the data transmitted to the at least one second node and the elapsed time threshold value is a function of the data size.

12. The system of claim 9, further including means for deferring transmission of messages by the first node onto the network, the deferred message(s) being transmitted upon exceeding an elapsed time threshold value.

13. The system of claim 9, further including means for deferring transmission of message(s) by the first node onto the network, the deferred message(s) being subsequently transmitted upon the first node receiving a reply from the at least one second node.

14. The system of claim 9, wherein the first node comprises a processor and the storage device is an outstanding request queue, the outstanding request queue being at least partially maintained in the processor.

15. The system of claim 12, wherein the deferred message(s) are maintained in a deferred message queue, the deferred message queue being at least partially maintained in the first node.

16. The system of claim 15, wherein the first node and the least one second node include a processor.

17. The method of claim 7, wherein the threshold time interval is determined by calculating: L*N/R, where L is a size of the data, N is a virtual number of nodes over the network, and R is a minimum transmission rate of the network.

18. The communication system of claim 9, wherein the elapsed time threshold is determined by calculating L*N/R, where L is a size of the data, N is a virtual number of nodes over the transmission medium, and R is a minimum transmission rate of the transmission medium.

* * * * *

UNITED STATES PATENT AND TRADEMARK OFFICE
CERTIFICATE OF CORRECTION

| | | |
|---|---|---|
| PATENT NO. | : 7,388,834 B2 | Page 1 of 1 |
| APPLICATION NO. | : 09/895577 | |
| DATED | : June 17, 2008 | |
| INVENTOR(S) | : Sachin U. Naik et al. | |

It is certified that error appears in the above-identified patent and that said Letters Patent is hereby corrected as shown below:

In column 9, line 22, in Claim 3, delete "(cl)" and insert -- (c1) --, therefor.

Signed and Sealed this

Sixteenth Day of September, 2008

JON W. DUDAS
*Director of the United States Patent and Trademark Office*